(12) United States Patent
Rao et al.

(10) Patent No.: US 8,583,165 B2
(45) Date of Patent: Nov. 12, 2013

(54) SYSTEM FOR CARTOON CREATION AND DISTRIBUTION TO MOBILE DEVICES

(76) Inventors: Bindu Rama Rao, Laguna Niguel, CA (US); Rohit Rao Jayanthi Kolar, Laguna Niguel, CA (US); Mallika Rao Jayanthi Kolar, Laguna Niguel, CA (US)

( * ) Notice: Subject to any disclaimer, the term of this patent is extended or adjusted under 35 U.S.C. 154(b) by 1334 days.

(21) Appl. No.: 11/888,099

(22) Filed: Jul. 30, 2007

(65) Prior Publication Data
US 2008/0200191 A1  Aug. 21, 2008

Related U.S. Application Data

(60) Provisional application No. 60/902,309, filed on Feb. 20, 2007.

(51) Int. Cl.
  *H04M 1/00* (2006.01)
(52) U.S. Cl.
  USPC ....... 455/550.1; 455/66.1; 455/566; 345/473; 345/474; 345/475
(58) Field of Classification Search
  USPC ............ 455/53.1, 66.1, 70, 90.2, 140, 412.1, 455/414.1, 550.1, 557, 463, 566; 345/473–475, 684, 687–688, 949, 956, 345/594, 601–602, 650, 661, 676, 689, 522, 345/531–532, 536–541, 547; 340/7.56
  See application file for complete search history.

(56) References Cited

U.S. PATENT DOCUMENTS

| | | | | |
|---|---|---|---|---|
| 4,305,131 A * | 12/1981 | Best | ................. | 715/716 |
| 4,445,187 A * | 4/1984 | Best | ................. | 463/31 |
| 4,897,799 A * | 1/1990 | Le Gall et al. | ................. | 709/246 |
| 5,675,395 A * | 10/1997 | Martin et al. | ................. | 348/734 |
| 5,678,012 A * | 10/1997 | Kimmich et al. | ................. | 725/37 |
| 5,852,435 A * | 12/1998 | Vigneaux et al. | ................. | 345/428 |
| 6,100,881 A * | 8/2000 | Gibbons et al. | ................. | 715/201 |
| 6,193,152 B1 * | 2/2001 | Fernando et al. | ................. | 235/380 |
| 6,396,500 B1 * | 5/2002 | Qureshi et al. | ................. | 345/473 |
| 6,907,271 B2 * | 6/2005 | Senarath et al. | ................. | 455/562.1 |
| 7,653,418 B1 * | 1/2010 | Biere et al. | ................. | 455/567 |
| 8,189,472 B2 * | 5/2012 | McDonald et al. | ................. | 370/235 |
| 2002/0089504 A1 * | 7/2002 | Merrick et al. | ................. | 345/473 |
| 2002/0138279 A1 * | 9/2002 | Al-Kazily et al. | ................. | 705/1 |
| 2002/0161666 A1 * | 10/2002 | Fraki et al. | ................. | 705/26 |
| 2004/0038670 A1 * | 2/2004 | Ando et al. | ................. | 455/412.1 |
| 2005/0042591 A1 * | 2/2005 | Bloom et al. | ................. | 434/307 A |
| 2006/0117356 A1 * | 6/2006 | Jojic et al. | ................. | 725/88 |
| 2006/0294465 A1 * | 12/2006 | Ronen et al. | ................. | 715/706 |
| 2007/0054679 A1 * | 3/2007 | Cho et al. | ................. | 455/466 |
| 2007/0143495 A1 * | 6/2007 | Porat | ................. | 709/238 |
| 2007/0277205 A1 * | 11/2007 | Grannan | ................. | 725/80 |

* cited by examiner

*Primary Examiner* — Kashif Siddiqui
*Assistant Examiner* — Marisol Fahnert

(57) ABSTRACT

A system for creating cartoons for mobile devices facilitates the creation and dissemination of cartoons to a plurality of mobile devices and computers. A cartoon can comprise of multiple panels, and each panel, in addition to graphics and text, can have an ordered set of audio (voice, music, etc.) provided, which are played back in a mobile device by a cartoon client component in the specified order for each of the panels. A computer or PC comprising the cartoon creator functionality is used to generate cartoons and communicate it to a cartoon distribution server. Mobile devices have a cartoon client component to receive and present the cartoon to a user. A cartoon creator device makes it possible for a user to create and distribute cartoons.

20 Claims, 13 Drawing Sheets

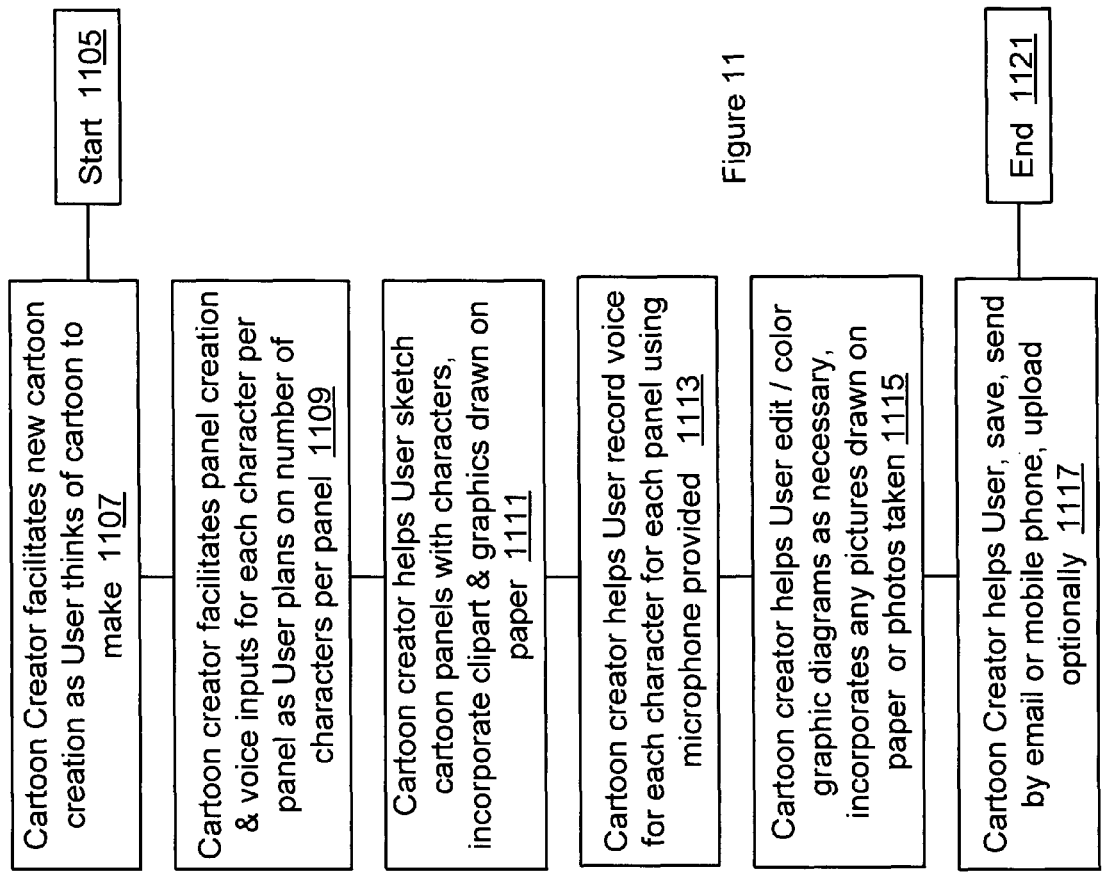

SYSTEM FOR CARTOON CREATION AND DISTRIBUTION TO MOBILE DEVICES

CROSS REFERENCES TO RELATED APPLICATIONS

This patent application makes reference to, claims priority to and claims benefit from U.S. Provisional Patent Application Ser. No. 60/902,309, entitled "SYSTEM FOR CARTOON CREATION AND DISTRIBUTION TO MOBILE DEVICES," filed on Feb. 20, 2007. The complete subject matter of the above-referenced U.S. Provisional Patent Application is hereby incorporated herein by reference, in its entirety.

This patent application makes reference to U.S. Provisional Patent Application Ser. No. 60/524568, entitled "QUESTIONNAIRE NETWORK FOR MOBILE HANDSETS," filed on Nov. 24, 2003. The complete subject matter of the above-referenced United States Provisional Patent Application is hereby incorporated herein by reference, in its entirety."

This patent application makes reference to U.S. patent application Ser. No. 10/985,702, entitled "QUESTIONNAIRE NETWORK FOR MOBILE HANDSETS," filed on Nov. 10, 2004. The complete subject matter of the above-referenced United States patent application is hereby incorporated herein by reference, in its entirety.

This patent application makes reference to U.S. Provisional Patent Application Ser. No. 60/530175, entitled "QUESTIONNAIRE NETWORK FOR MOBILE HANDSETS AND A TRADING SYSTEM FOR CONTRACTS ON USER COMMITMENTS TO ANSWER QUESTIONNAIRES," filed on Dec. 17, 2003. The complete subject matter of the above-referenced United States Provisional Patent Application is hereby incorporated herein by reference, in its entirety.

This patent application makes reference to U.S. patent application Ser. No. 10/985,702, entitled "QUESTIONNAIRE NETWORK FOR MOBILE HANDSETS," filed on Nov. 10, 2004. The complete subject matter of the above-referenced United States patent application is hereby incorporated herein by reference, in its entirety.

This patent application makes reference to United States provisional patent entitled "QUESTIONNAIRE CLIENT FOR MOBILE DEVICE", filed on Oct. 4, 2006, Ser. No. 60/849,715. The complete subject matter of the above-referenced United States patent application is hereby incorporated herein by reference, in its entirety.

This patent application makes reference to United States provisional patent entitled "MOBILE DEVICE FOR CREATING ADHOC QUESTIONNAIRE", filed on Oct. 7, 2006, Ser. No. 60/850,084. The complete subject matter of the above-referenced United States patent application is hereby incorporated herein by reference, in its entirety.

This patent application makes reference to United States provisional patent entitled "QUESTIONNAIRE SERVER CAPABLE OF PROVIDING QUESTIONNAIRES BASED ON DEVICE CAPABILITIES", filed on Nov. 13, 2006, Ser. No. 60/858,546. The complete subject matter of the above-referenced United States patent application is hereby incorporated herein by reference, in its entirety.

This patent application makes reference to United States provisional patent entitled "SYSTEM FOR PROVIDING INTERACTIVE MEDIA TO USER OF MOBILE DEVICE", filed on Feb. 4, 2007, Ser. No. 60/899,493. The complete subject matter of the above-referenced United States patent application is hereby incorporated herein by reference, in its entirety.

BACKGROUND

1. Technical Field

The present invention relates generally to the interactions between mobile device and a server within a network, and more specifically to the ability to provide interactive media to a user of a mobile device.

2. Related Art

Electronic devices, such as mobile phones and personal digital assistants (PDA's), often contain small screens with very limited viewing area. They are constrained in terms of how much information can be displayed, and in terms of user interaction capabilities. The keyboards on cell phones, for example, are not conducive for user data entry, and only brief user inputs can be solicited from a user without annoying the user. However, mobile phones are also not convenient for viewing a large amount of text or browsing through busy web pages provided by most Internet web sites.

Many people would like to view cartoons on their mobile devices. However, the experience is limited and primitive as all they can currently do is view one panel of a cartoon at a time, after accessing a web site that provides cartoons. These cartoons are just scanned copies or some graphic provided by a creator, which are often true copies of those provided for published/printed media, such as magazines and newspapers. These cartoon providers try to replicate the cartoon viewing experience from a news paper. They do not make use of the other features/capabilities of the mobile device (or an PC computer either) that could be leveraged to provide a much more satisfactory experience and quality. These online cartoon providers provide a version (a graphic version, such as using a graphic image or a PDF of a graphic image) of modern gag cartoons, found in magazines and newspapers, that generally consist of a single drawing with a caption immediately beneath or (less often) a speech balloon.

Editorial cartoons are often not provided online to a mobile device. They are a type of gag cartoon found almost exclusively in news publications. Although they also employ humor, they are more serious in tone, commonly using irony or satire. The art usually acts as a visual metaphor to illustrate a point of view on current social and/or political topics. Editorial cartoons often include speech balloons and, sometimes, multiple panels.

Cartoons that have multiple panels are typically not available online, and especially on mobile devices. Comic strips, also known as "strip cartoons" in the United Kingdom, are found daily in newspapers worldwide, and are usually a short series of cartoon illustrations in sequence. In the United States they are not as commonly called "cartoons" themselves, but rather "comics" or "funnies". Nonetheless, the creators of comic strips—as well as comic books and graphic novels—are referred to as "cartoonists". Although humor is the most prevalent subject matter, adventure and drama are also represented in this medium. The availability of such comic strip cartoons are often restricted to printed media such as news papers. Some Internet webpages provide access to a version of these—however they are not appropriate for mobile devices, and they do not incorporate features that can make these comic strip cartoons more flexible and better in user experience. For example, they lack time ordered delivery of subject matter information or dialogs associated with the multiple characters.

Some recent motion pictures are based on animated cartoons. These are expensive projects costing multiple millions of dollars and several hundred employees to make them and a TV or DVD player to view them. They can also be viewed as typical movies using streaming media on computers, over the Internet.

An animated image, such as that of an animated cartoon horse, for example a cartoon horse drawn by rotoscoping from Edweard Muybridge's 19th century photos, also are popular. According to Wikipedia, because of the stylistic similarities between comic strips and early animated movies, "cartoon" came to refer to animation, and this is the sense in which "cartoon" is most commonly used today. These are usually shown on television or in cinemas and are created by showing illustrated images in rapid succession to give the impression of movement. (In this meaning, the word cartoon is sometimes shortened to toon, which was popularized by the movie Who Framed Roger Rabbit). Although the term can be applied to any animated presentation, it is most often used in reference to programs for children, featuring anthropomorphized animals, superheroes, the adventures of child protagonists, and other related genres. Animated material which does not fit the traditional conventions of mainstream Western animation, such as Japanese anime are often confused with the definition of cartoons The whole process of creating cartoons is quite difficult, with drawling tools used to draw them on computers. Then they have to be emailed or somehow sent to publishers of magazines and newspapers. For people unaffiliated with newspapers and magazines, there are limited avenues for sharing it with others. A few enterprising individuals setup special customized websites to exhibit their cartoons, but they have to be tech-savvy and be able to work with and manage their web sites. However, kids and non-technical individuals cannot setup and manage websites although they would be interested in creating cartoons and sharing them with friends and family.

Accessing cartoons available on typical Internet based websites from mobile devices is quite often unsatisfactory and not useful due to several factors, not least of which is the multi-media and graphics rich format in which most Internet websites are designed and made available and the verbosity of text to wade through, and the difficulty of typing on small keyboards on a mobile phone. A mobile phone with a small screen is not a good candidate for viewing such complicated and graphics rich (with graphics, flash screens, video components, etc.) content—imagine a webpage being presented to a user that a music component, a whole a page of text (over 3 KB of text) embedded with three large diagrams, and a table of information, all on the same webpage. Such a multi-media webpage is very typical for Internet access, and is obviously unsuitable for a mobile device.

Thus, there is a problem in presenting a mobile user with cartoons when the user is using a mobile phone. Requiring a user to provide text inputs to retrieve or search for a cartoon input is a big problem.

Typically, space on the graphics of a panel of a cartoon is wasted to show balloons of text, as it is typically done in comic strings and political cartoons. Thus, the graphic on a panel looses some of the details as text balloons can occupy a lot of space of the panel, sometimes as much as 50%, typically 30% of the space (often at the top of the panel). Such space is wasted when they have been set aside for text balloons (such as for the textual display of dialogs of the characters).

Mobile devices such as a cell phone are therefore devices for which traditional Internet websites, including websites that provide cartoons, are ill prepared to provide information. However, the same Internet web page would be unmanageable and difficult to browse and navigate on a cell phone with a small LCD screen and small keyboard for user input.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

The numerous objects and advantages of the present invention may be better understood by those skilled in the art by reference to the accompanying figures in which:

FIG. 1 is a perspective block diagram of a cartoon creation and distribution system 105 for mobile devices that facilitates the creation and dissemination of cartoons to a plurality of recipient mobile devices and computers/notebooks, wherein the cartoons are disseminated to the recipient mobile devices and computers in a form that is compatible with the capabilities of the respective devices and wherein the selections/preferences of the user are also factored in.

FIG. 11 is an exemplary flow chart of the operation of the cartoon creator device wherein the cartoon creator device is used by a user to create and send a multi-panel cartoon.

DETAILED DESCRIPTION OF THE DRAWINGS

Figure 1:
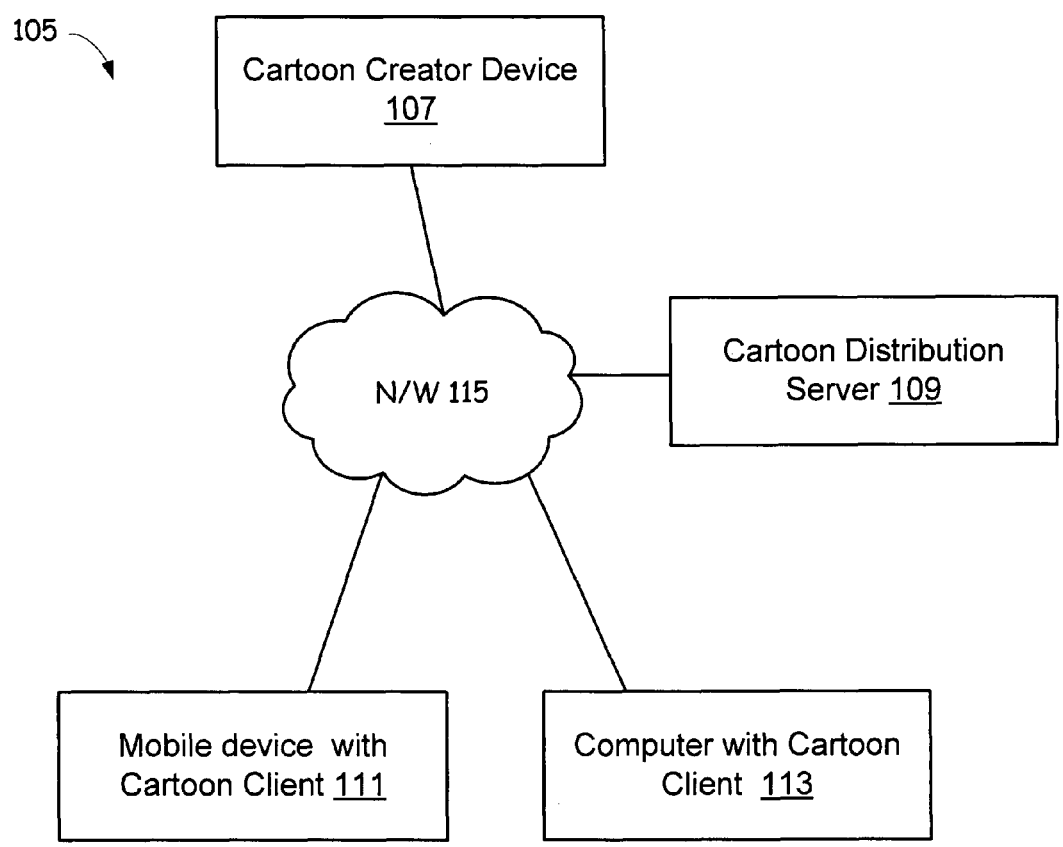

FIG. 1 is a perspective block diagram of a cartoon creation and distribution system 105 for mobile devices that facilitates the creation and dissemination of cartoons to a plurality of recipient mobile devices 111 and computers/notebooks 113, wherein the cartoons are disseminated to the recipient mobile devices 111 and computers 113 in a form that is compatible with the capabilities of the respective devices 111, 113, and wherein the selections/preferences of the user are also factored in. The cartoon creation and distribution system 105 comprises the cartoon creator device 107, the recipient mobile devices 111, the computer/notebook with cartoon client 113 and a cartoon distribution server 109. The display of cartoons in a recipient mobile device or a computer, such as the recipient mobile device 111 and the computer 113, requires the use of a corresponding cartoon client component, such as a QClient, that can display/render cartoons, one at a time. Each cartoon comprises one or more panels (sometimes also called frames), with each panel displayed one at a time by the cartoon client component, with any audio dialogs presented to the user in a specified order, with the possibility of having multiple dialogs per panel. The multiple dialogs in audio form is played for each panel by the cartoon client component with an optional pause between them, and optionally requiring the cartoon recipient to progress to the next dialog/audio component before it is played/rendered.

The cartoon creator device 107 makes it possible to create cartoons with one or more panels (or frames) with each panel comprising a textual caption, a graphic an animated graphic or video clip, and one or more ordered audio portions. The audio portions is human voice, music, noise, synthesized audio, etc. The audio portions can also be a combination of human or synthesized voice, captured live music, previously recorded audio components or a combination of these. The audio portions are ordered such that a specific/recommended order is assigned to them to facilitate playback by a cartoon client component or other software in the specified/recommended order.

The cartoon creator device 107 provides voice capture so that voice inputs for the various dialogs for the various characters of a cartoon panel can be captured and stored, often in digital form. Thus, space on the graphics of a panel will not be wasted to show balloons of text, as it is typically done in comic strings and political cartoons. Thus, the graphic on a panel can be mode detailed and can occupy all the available space of the panel including those that would have been set aside for dialog balloons.

The cartoon creator device 107 provides cartoons comprising multiple panels/frames, each panel comprising graphics, one or more audio components per panel, one or more short textual descriptions/dialogs per panel, etc. It sends the created cartoon to the cartoon distribution server 109 to be disseminated to one or more recipient using mobile devices 111 or computers 113. The recipient mobile device 111 with the cartoon client receives cartoons from the cartoon distribution server 109 and lets a user browse through it. The cartoon distribution server 109 receives a cartoon from the cartoon creator 107. It forwards it to specified recipient mobile devices 111 and computers 113. In one embodiment, the cartoon distribution server 109 multicasts/broadcasts the cartoon to users who have subscribed for it, such as using RSS feeds, etc.

The cartoon creator device 107 embodies a cartoon creator functionality that supports creation and storage of cartoon, and incorporation of graphics, images audio sounds, music, animation, photographs, video clips, etc. into a cartoon. It can be a part of a computer/notebook/PC/laptop, incorporated into a mobile device (such as a PDA, mobile phone, MP3 player, etc.) or provided as a special device with its own processing power, graphics support, viewing screen (such as, an LCD monitor, interactive screen, etc.)

In one embodiment, the cartoon creator device 107 also incorporates photographs taken with a camera (communicatively coupled to the cartoon creator device 107 or part of the cartoon creator device 107) by a user actively during the creation of a cartoon. The photographs being taken by a camera communicatively coupled to cartoon creator device 107 (in one embodiment a PC or and in another, a mobile device, on which the cartoon creator is installed) or part of the cartoon creator device 107.

In one embodiment, the cartoon creator is on a mobile device 111, and is either incorporated into a cartoon client component or installed as a separate component in the mobile device. In addition, the camera on the mobile device 111 is employed to take pictures (photographs) that are incorporated into the panels of the cartoon created by the user. Thus, a mobile user can create cartoons using the camera on the mobile device 111 for taking adhoc pictures that are incorporated into the panels of a cartoon, using the voice recorder on the mobile device 111 for providing one or more voice portions that are associated with the appropriate panels of a cartoon in a specified order, and optional textual captions provided on the keyboard, if any, on the mobile device 111.

Each cartoon can comprise of several components, some of which are graphics, video content, textual content, and/or audio content. These components may be adapted to the device by the cartoon distribution server to make them more appropriate for the recipient devices. For example, a cartoon may be made more compatible (by making it smaller or more compact) to a particular mobile device if it is not capable of displaying a default size (albeit small) presented by a cartoon creator 107.

The cartoon creator device 107 is communicatively coupled to the distribution server 109 via network 115. It makes it possible for a user, such as child making a cartoon to be sent to the child's grandmother (to her mobile phone), to incorporate text, audio, voice, music, video, graphics etc. into the cartoon. For example, each cartoon comprises captions, optional textual descriptions of dialogs of characters, audio preambles (for example, voice or music), optional audio dialogs for the characters of the cartoon, for each panel of a multi-panel cartoon. A user can view each panel of the cartoon (often viewing text graphics) and listen to the ordered set of audio components, such as ordered set of voice recordings for each of the characters shown in the panel of the cartoon, viewing each panel of the cartoon, one panel at a time, and browse through each of the panels.

In one embodiment, the cartoon distribution server 109 determines which recipient mobile device can handle cartoons (because they comprise the client component capable of handling the cartoon, and because the cartoon comprise metadata used to determine appropriateness for a device), and which need to be sent a simpler subset of the cartoon that can be displayed/rendered without the client component, such as by the use of a browser in the recipient mobile device. The browser may then be used to browse through a hosted version of the cartoon that is presented as a set of one or more web pages by the cartoon distribution server 109.

The cartoon is created/stored/distributed as a packaged content with associated metadata, employing a structured format such as an XML file.

The cartoon distribution server 109 is capable of converting recipient list provided by a sender (typically the creator of the cartoon) to a list of phone numbers or IP addresses as needed, in order to communicate the cartoon, or a notification regarding the availability of cartoon, to the recipient mobile devices 111 and computers 113. In order to play all the components of a cartoon, if required, the recipient devices, such as the recipient device 111, have a client component that can handle all the components of a received cartoon, audio, textual, graphics and even video components.

Some mobile devices may not have the cartoon client. In order to play all the components of a cartoon, the cartoon distribution server 109 makes it possible for them to receive and display/play the cartoon by sending them the same cartoon in an alternate form, such as a simplified set of web pages, that the recipient mobile device 111 can display using a browser or some other existing client in the recipient mobile device 111. In addition, the recipient mobile device 111 will be sent a notification regarding the availability of an appropriate cartoon sent to them, the notification also comprises a link that can be activated to download the cartoon client component so that it could be installed, before displaying the cartoon.

In one embodiment, the system 105 comprises the cartoon generator 107, mobile devices 111 which are a combination of cellular phones, PDAs, etc., computer 113, and the network 115 that is a wireless and/or wired network, cellular network such as 3G, UMTS, CMDA, GSM, etc., a WLAN network, or a WiMAX network, Internet, Bluetooth, IrDA, etc.

Thus, the present invention provides a system for creating cartoons for mobile devices wherein the system facilitates the creation and dissemination of cartoons to a plurality of mobile devices and computers. A cartoon can comprise of multiple panels, and each panel, in addition to graphics and text, can have an ordered set of audio (voice, music, etc.) provided, which are played back in a recipient mobile device by the cartoon client component in the specified order for each of the panels. A computer or PC comprising the cartoon creator functionality is used to generate cartoons and communicate it to the cartoon distribution server. Mobile devices have the cartoon client component to receive and present the cartoon to a user. The cartoon creator device makes it possible for a user to create and distribute cartoons.

Figure 2:
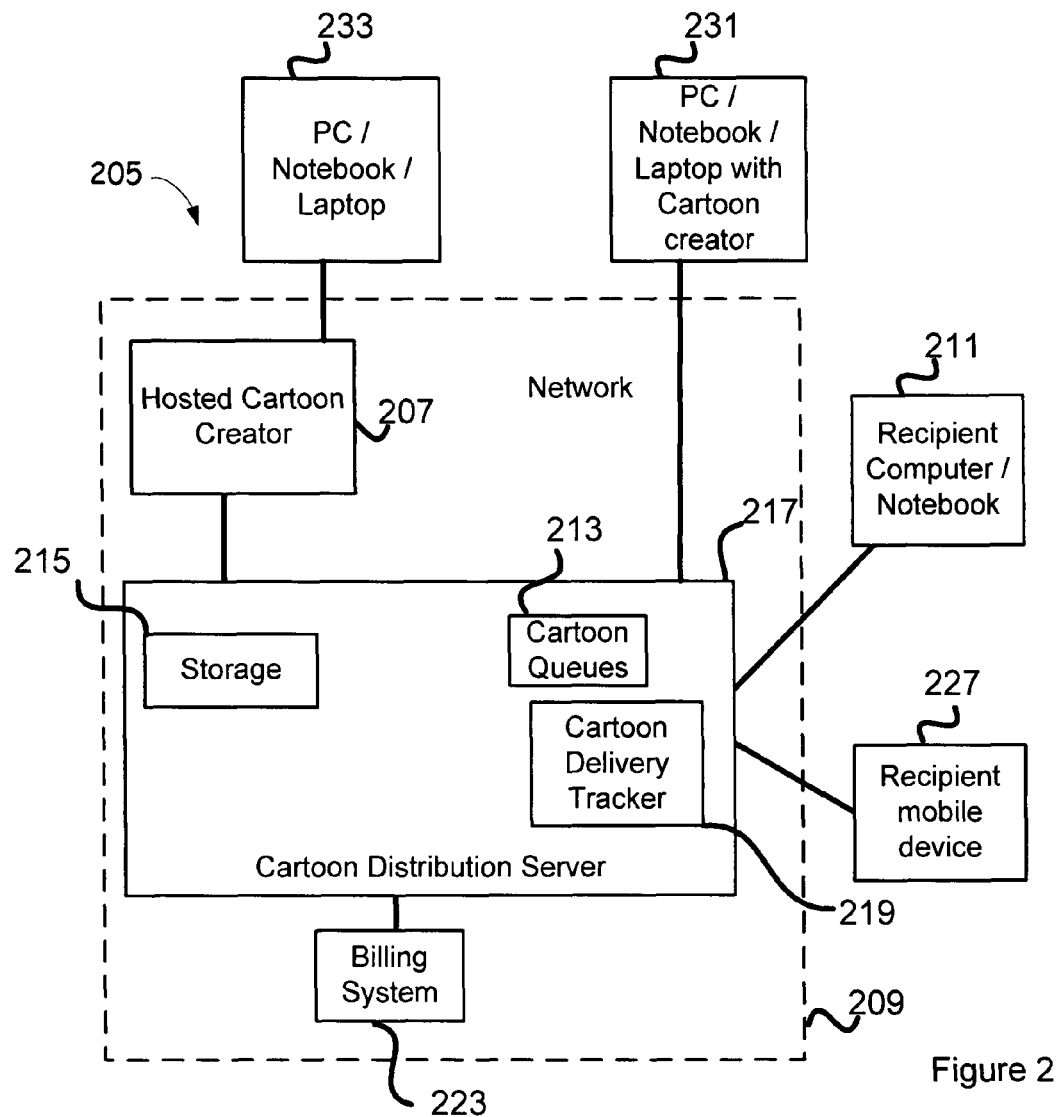
FIG. 2 is a perspective block diagram of a system that supports cartoon creation and dissemination, that is facilitated by the use of a PC/Notebook/Laptop with Cartoon creator, by a user, or by the use of a hosted cartoon creator that is accessed by the user using a PC/notebook/laptop.

FIG. 2 is a perspective block diagram of a system 205 that supports cartoon creation and dissemination, that is facilitated by the use of a PC/Notebook/Laptop with Cartoon creator 231, by a user, or by the use of a hosted cartoon creator 207 that is accessed by the user using a PC/notebook/laptop 233. The system 205 comprises the PC/computer 231 that a user uses to create a cartoon, a cartoon distribution server 217 that receives the cartoon and sends them to one or more recipient mobile devices 227 and recipient computer 211, and the hosted cartoon creator 207 that facilitates cartoon creation using the PC/notebook/laptop 233, or via web pages provided by the cartoon distribution server 217.

In general, a user can create cartoons by interacting with the cartoon creation service provided by the hosted Cartoon Creator 217 or by interacting with the cartoon creator client in the PC/Notebook/Laptop with Cartoon Creator 231: A user with cartoon creation client in a PC/Notebook/Laptop 231 creates cartoon content, and then sends it to recipients/maillist. The recipients can be specified as phone numbers, email addresses or IP addresses. A user can also employ a PC communicatively coupled to a hosted cartoon creation tool to create cartoon content with audio inputs, graphics and textual inputs (such as those appropriate for a mobile device).

Then user typically provides a recipient list along with a new cartoon created by the user. The cartoon distribution server 217 sends out the cartoon content (or reference to it) to specified recipients, using their mobile phone numbers, IP addresses, email addresses, etc.

The cartoon distribution server 217 also comprises a storage 215 that is used to store cartoons, user profiles, required user profiles desired by individuals or companies interested in disseminating cartoons. It also comprises a cartoon delivery & tracking component 219 that stores results and activity logs that can be used to track cartoon creation, dissemination, and other related activities.

The system 205 also comprises a billing system 223 that can facilitate billing for the creation of cartoons, the distribution of cartoons, the charges or payments made to recipients of cartoons for viewing the cartoons, the charges made to individuals and companies when a recipient views delivered cartoons, etc. In general, a cartoon comprises content (with or without graphics and multimedia) that requires a user to interact with a client in the viewing of it, the experience comprising user interaction. User interaction comprises user making a selection, choosing one or more items, clicking on displayed information, advancing, entering text as user inputs, providing audio inputs, or a combination of these.

The cartoon distribution server 217 comprises a plurality of queues 213 for each user, wherein each of the plurality of queues holds a different category of cartoons for a recipient, or references to cartoons of a specific type of category that a user is likely to be interested in. In one embodiment, the cartoon distribution server 217 maintains several queues 213 of cartoons, some of the queues dedicated to specific categories of cartoons, to specific companies creating the cartoons, or to user groups. Other types of queues are also contemplated. When a new entry is made to any queue, target recipients are identified by the cartoon distribution server 217 and the cartoon is either communicated to the recipients, a notification of its availability is communicated to the recipients while an entry is made in a queue for each of the recipients in the cartoon distribution server 217 with a reference (such as an identification) to the actual cartoon stored along with it, or a copy of the cartoon is entered into a queue that is delivered to a recipient or browsed through by the recipient using the recipient mobile device 227.

Cartoon creation is also facilitated by the hosted cartoon creator 207 that can be accessed and used by a user employing the PC/Notebook/Laptop 233. A cartoon creation tool installed in the PC/Notebook/Laptop 231 may also be used by a user to create cartoons that can be uploaded to the cartoon distribution server 217. A user with cartoon creation tool in the PC/Notebook/Laptop 231 creates a cartoon and sends the created cartoon to recipients/a mailing-list that the cartoon distribution server 217 can communicate with.

In one embodiment, when a recipient using the recipient mobile device 227 gets the cartoon on his mobile device 227, the segments of the cartoon themselves are provided to the recipient by the cartoon distribution server 217, starting with the first panel of a multi-panel cartoon. Thus, in the beginning of the cartoon, the recipient would view the first panel, perhaps with an audio portion and appropriate textual captions and description, and would be able activate a Next menu item to advance to the next panel, if any. The user advances to the next panel by activating the Next menu item to proceed, and the cartoon distribution server 217 provides one panel at a time, etc. Alternatively, all panels are provided at once to the recipient mobile device 227 wherein the cartoon client component manages its local display/rendering.

Figure 3A:
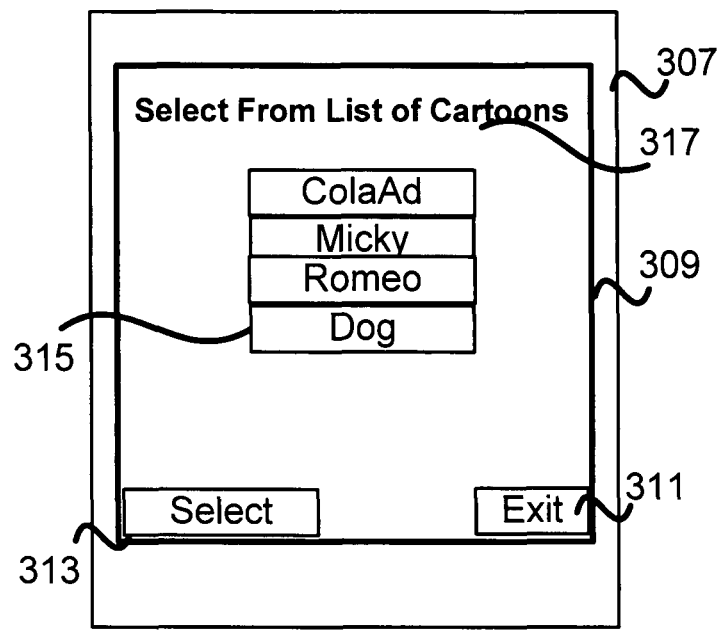
FIG. 3A is an exemplary display screen for a mobile device that supports the display of cartoons using an cartoon client component.

FIG. 3A is an exemplary display screen 309 for a mobile device 307 that supports the display of cartoons using an cartoon client component. On mobile devices that do not have the cartoon client, a browser in the mobile device is used for browsing through a cartoon using a browser in the mobile device 307. The mobile device 307 receives notifications from the cartoon distribution server, notifications such as those received as an SMS message, sent to the user (for example, message of type Service message). The notifications offer the user an opportunity to download a client component that is capable of displaying a cartoon.

The exemplary display screen 309 provides a list of cartoons 315 presented to the user, and the user can select one of them for display using a select button 313 or menu item provided. The user can exit the cartoon client by activating the exit button 311 or appropriate menu item.

A list of cartoons available to the user is presented to a user, who can select one at a time on his mobile device 307 or PC, and view them and interact with them. The list can be based on user preferences or current subscriptions of a user. The user can select one of the listed cartoons or view more than one, but only one at a time. In addition, a user can dismiss the listed cartoons by activating the Exit button/menu item 311.

In one embodiment, the list of cartoons 315 are those provided to the user by a cartoon distribution server. Such a list is provided based on user preferences and user profile by a server. A user can subscribe to one or more categories of cartoons, or one or more sources of cartoons (sources being content development companies, etc.) and the cartoon distribution server stores that information as part of the user's preferences and selects cartoons for delivery to the mobile device 307 based on that. In a related embodiment, such a list is provided based on a priority of cartoons determined by the cartoon distribution server. In a different embodiment, the user's selections of various subscriptions of cartoons is managed by the cartoon distribution server which provides an RSS feed of the selected cartoons to the user on his mobile device 307.

In one embodiment, the mobile screen 309 is a screen saver screen that is displayed to the user when the user is not using the phone (meaning the phone has been idle for a while). The screen saver 309 on the mobile gets a list of cartoons and displays it to the user. The user can select one of them, and advance to others subsequently, and exit the screen saver whenever the user wants to. In one embodiment, the screen saver 309 is provided references to cartoons as a list to be displayed, wherein the list is complied by a cartoon distribution server based on user's preferences, subscriptions to cartoons, user profile (comprising user's interests, hobbies, employment, residential location, etc.) or a combination thereof.

Figure 3B:
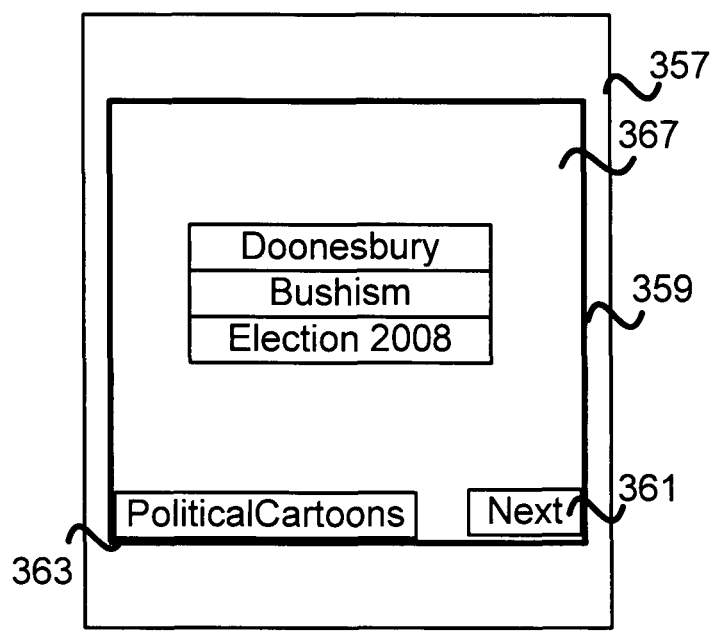
FIG. 3B is an exemplary screen of a cartoon client component on a mobile device wherein a list of available cartoon is displayed, that has been selected from an queue of cartoons.

FIG. 3B is an exemplary screen of a cartoon client component 359 on a mobile device 357 wherein a list of available cartoon 367 is displayed, that has been selected from an queue of cartoons 363. Using a Next button 361 on the screen 359, a user can advance to the next cartoon on the current queue PoliticalCartoons 363. The screen of the cartoon client component 359 can display cartoons from different queues when a user changes the current queue or select a queue by selecting one from a list of queues (shown in FIG. 3A). Each user has at least one queue of waiting cartoons at a cartoon distribution server (not shown), that is accessible by the cartoon client component 359. A user can set the priority of cartoon content from each queue, or a priority for content from more than one queue, or prioritize queues. A user can create a profile of user's interests, hobbies, employment, etc. that is incorporated for prioritizing cartoons selected and presented to the user.

Figure 3C:
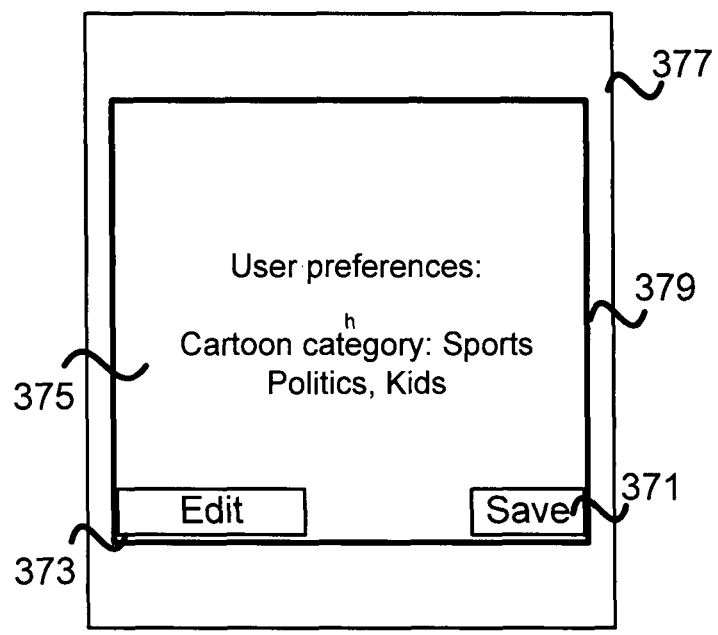
FIG. 3C is an exemplary screen/window on a mobile device that is used to by a user to set user preferences, specifically a selection of categories of cartoons to be delivered to the user, a priority being assigned to them too.

FIG. 3C is an exemplary screen/window 379 on a mobile device 377 that is used to by a user to set user preferences, specifically a selection of categories of cartoons to be delivered to the user, a priority being assigned to them too. The user preferences selected/provided by a user is communicated to a server that stores it and employs it to send cartoons to the user. The server selects/provides cartoons to the user satisfying user specified needs and preferences from the available cartoons, which is supplied by vendors of products, advertisers of products, services or suppliers of information or products, etc. The screen 379 makes it possible for a user to edit 373 the user preferences and save 371 updated preferences.

Figure 4:
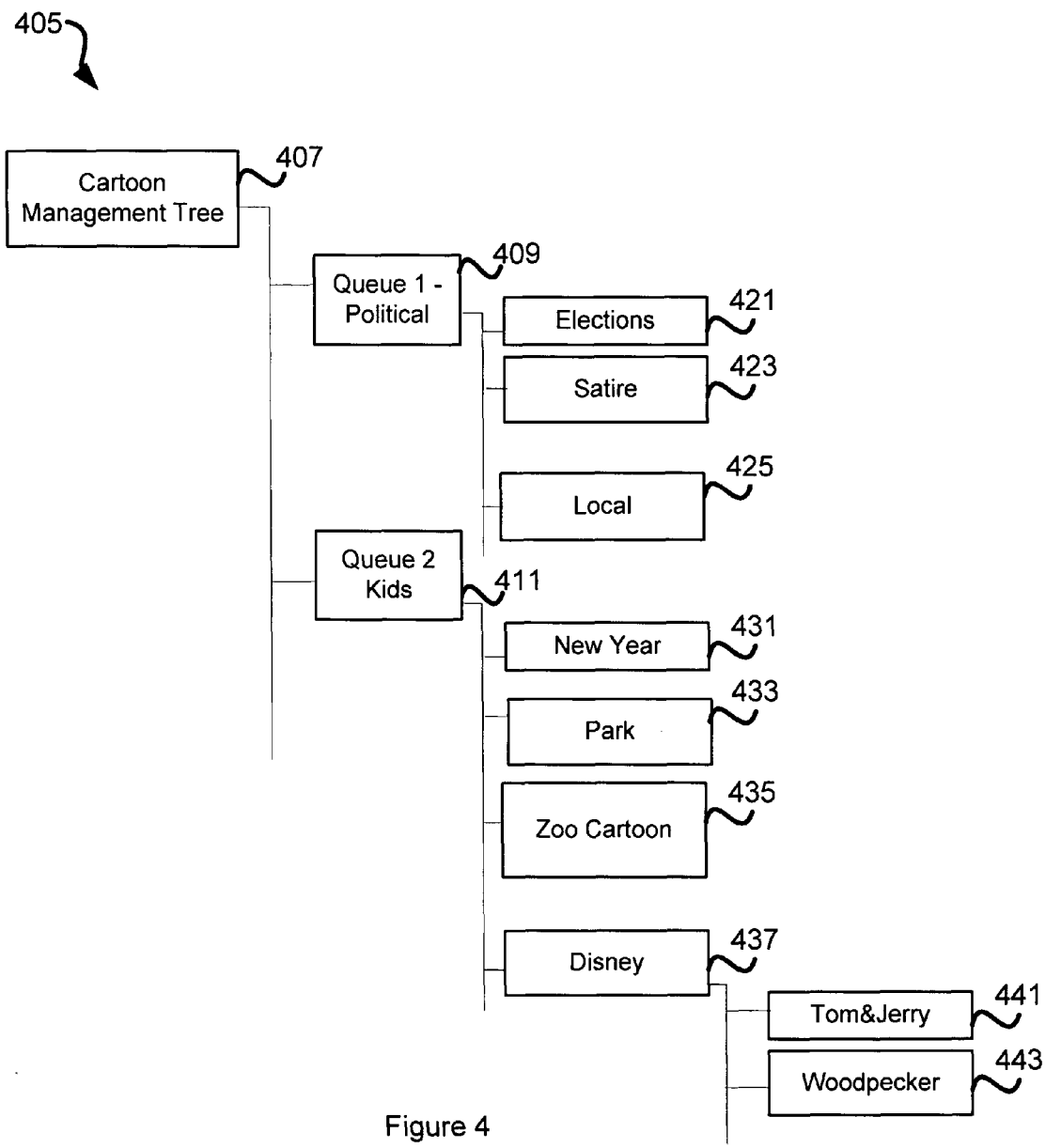
FIG. 4 is a perspective block diagram of the cartoon management tree of information, a logical organization of cartoons, by a cartoon distribution server in the system that facilitates creation and distribution of cartoons.

FIG. 4 is a perspective block diagram of the cartoon management tree 407 of information, a logical organization of cartoons, by a cartoon distribution server in the system that facilitates creation and distribution of cartoons. The cartoon management tree 407 comprises several categories of cartoon, each category assigned a queue, such as a queue 1 for politics related cartoons 409, which in turn comprises elections 421, satire 423 and local political cartoons 425. Similarly, kids related cartoons is assigned a queue 2 411 that can be used to store and distribute cartoons such as those for New Year 431, parks 433, zoo cartoons 435, Disney related cartoons 437, etc. The Disney related cartoons 437 can be those with Disney characters Tom& Jerry 441, Woody Woodpecker 443, etc.

Figure 5:
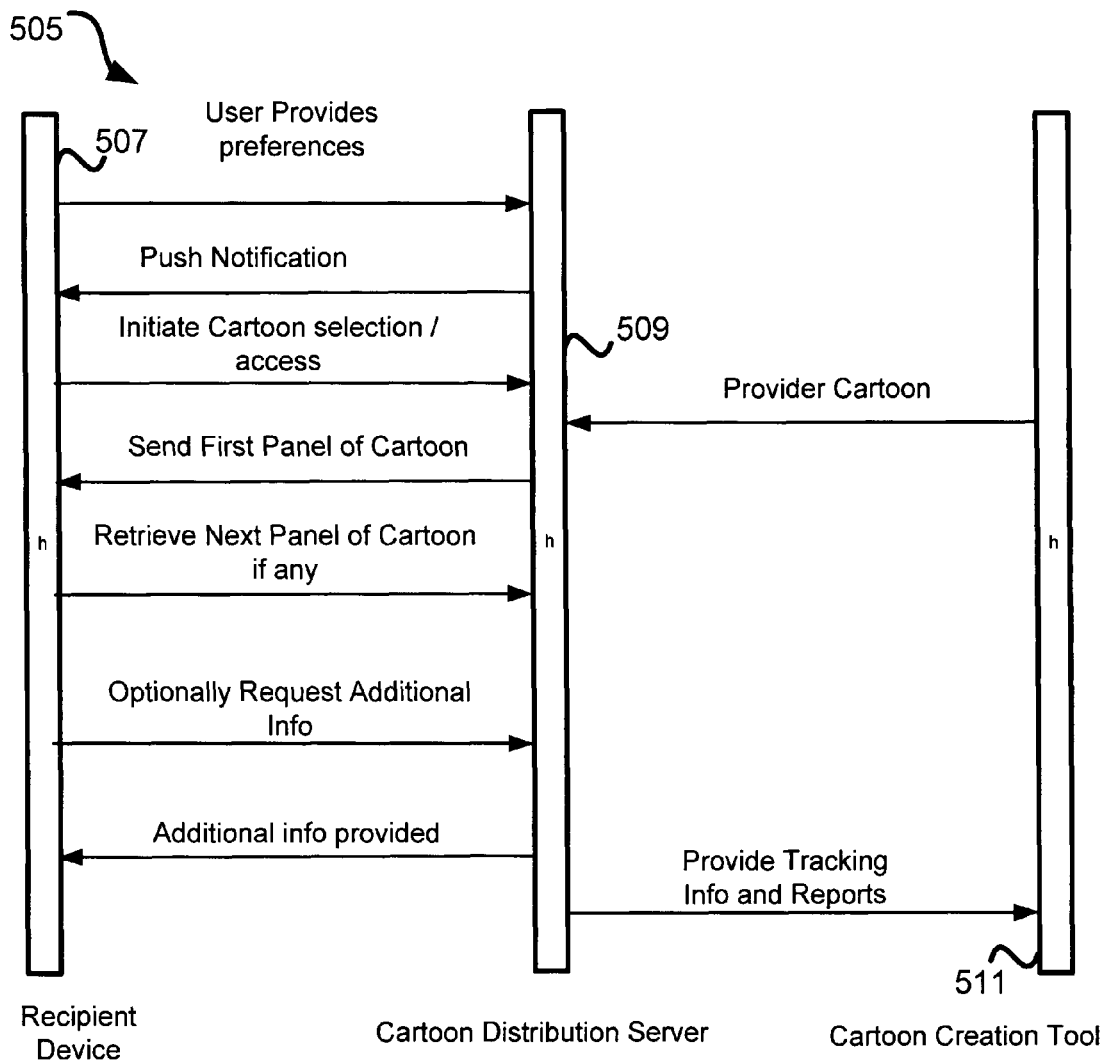
FIG. 5 is an interaction diagram that depicts an exemplary interaction between a recipient device used to view the cartoons, wherein the recipient device (a PC, notebook, PDA or laptop) is used by a user to access/retrieve cartoons from one or more cartoon distribution servers.

FIG. 5 is an interaction diagram that depicts an exemplary interaction between a recipient device 507 used to view the cartoons, wherein the recipient device (a PC, notebook, PDA or laptop 507) is used by a user to access/retrieve cartoons from one or more cartoon distribution servers 509. The recipient device 507 provides user preferences, such as categories of cartoons of interest to the user, to the cartoon distribution server 509, based upon which the distribution server 509 sends push notification to the recipient device 507. After receiving the push notification, a user can initiate access of (one or more) cartoons. The cartoon distribution server 509 sends one or more cartoons to the recipient device 507 for review by the user. Typically, the first panel is sent to the recipient device 507, and additional panels are sent as the user activates the next button in the cartoon client used to view the cartoons in the recipient device 507. Additional info related to/associated with the cartoons, such as details of the creator, may be requested by a user and the cartoon distribution server 509 sends them to the recipient device 507 for review by a user. The cartoons are typically created using an cartoon content creation tool 511 that is communicatively coupled to the cartoon distribution server 509. The cartoon content creation tool 511, or another external server, such as a billing server, can be the recipient of tracking information and reports sent by the distribution server 509.

Figure 6:
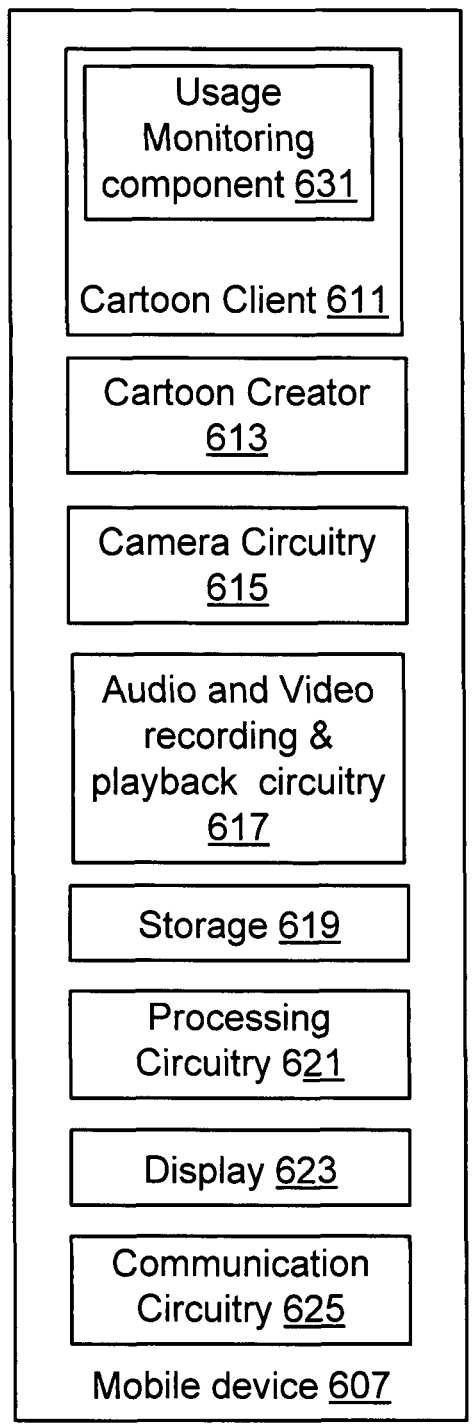
FIG. 6 is a perspective block diagram of a mobile device that capable of receiving and playing/rendering cartoons and monitoring its usage.

FIG. 6 is a perspective block diagram of a mobile device 607 that capable of receiving and playing/rendering cartoons and monitoring its usage. The mobile device 607 comprises a cartoon client 611 that in turn comprises a usage monitoring component 631. The mobile device 607 also comprises a cartoon creator 613, camera circuitry 615, an audio and video recording & playback circuitry 617, processing circuitry 621, communication circuitry 625, a storage 619 and a display

623. The cartoon creator 613 can be used to create cartoons using photos taken employing the camera circuitry 615 and using voice inputs provided to and recorded by the audio and video recording & playback circuitry 617.

The cartoon creator 613 and the cartoon client 611 are combined into one cartoon client in one embodiment.

Figure 7:
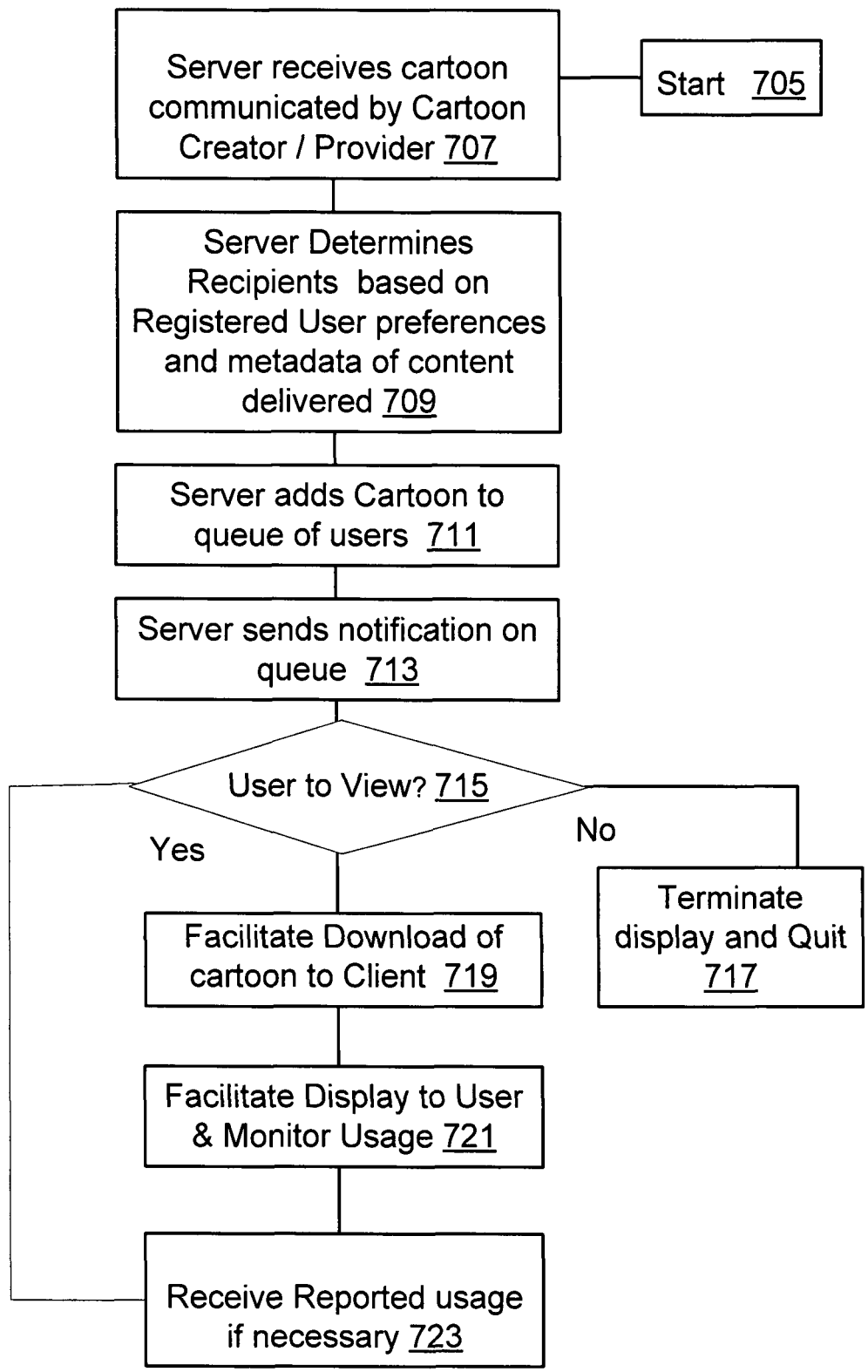
FIG. 7 is a flow chart of the operation of a cartoon distribution server as it receives cartoons from a provider and communicates it eventually to users of mobile devices and computers.

FIG. 7 is a flow chart of the operation of a cartoon distribution server as it receives cartoons from a provider and communicates it eventually to users of mobile devices and computers. At a start block 705, the operation starts when the cartoon distribution server gets ready to receive cartoons from a cartoon creator, such as a cartoon service provider or a child creating cartoons to send to its grandmother's mobile device. Then, at a next block 707, the cartoon distribution server receives cartoons from a provider of cartoons. At a next block 709, in the case of a subscription based system, the server determines who the recipients should be for the cartoons, based on user preferences available and metadata of the cartoons delivered by the provider. For example, the metadata comprises a category identification, a target profile describing a likely profile of recipients expected to be interested in the interactive media, security information such as credentials of the provider and authentication information, a digital signature of the interactive media for integrity check, etc. In the case of a creator provided list of recipients, the cartoon distribution server maps user names and mailing lists into (if necessary) lists of phone numbers, lists of IP addresses, lists of email addresses, etc.

Then, at a next block 711, the server adds the received and authenticated (and integrity checked) cartoon (or reference thereto) to queue of users 711 who are determined to be targets for delivery. Then, at a next bloc 713, the server sends a notification to the user's mobile device (or computer, as the case might be) to notify the user of the availability of the cartoons in the queue. In one embodiment, the server creates a list of references to the cartoons that is available, and sends it to the mobile device to be shown in a queue/list (or more than one queue/list) from which the user can select for individual viewing.

Then, at a next decision block 715, the user selectively decides to view the cartoons, and either selects it for viewing or terminates viewing, and the server gets to know about this user selection. In one embodiment, the user of the recipient mobile device browses through the list of available cartoons and selects one of them for viewing. If the user decides to view one of the items listed, the control passes to a next block 719, otherwise, processing terminates at a next block 717.

If, at the decision block 715, the user on the mobile device decides to view an interactive media (either from a list presented, from a notification received for interactive media or otherwise), at a next block 719, the cartoon client component downloads the cartoons from the cartoon distribution server which facilitates such downloads. Then at a next block 721, the cartoon is displayed to enable viewing by the user and the cartoon distribution server facilitates such display by providing any additional data portions (as user advances in the client component on the mobile device). The cartoon client component monitors usage by the user and send information associated with it to the cartoon distribution server that receives it. Finally, at the next block 723, the viewing of the cartoon by the user is reported to the cartoon distribution server by the cartoon client component, which optionally processes it and forwards it to a billing server or external server (such as one associated with the provider). Then, control loops back to the decision block 715 where the user is provided an opportunity to view additional cartoons that may be available by the cartoon distribution server.

Figure 8:
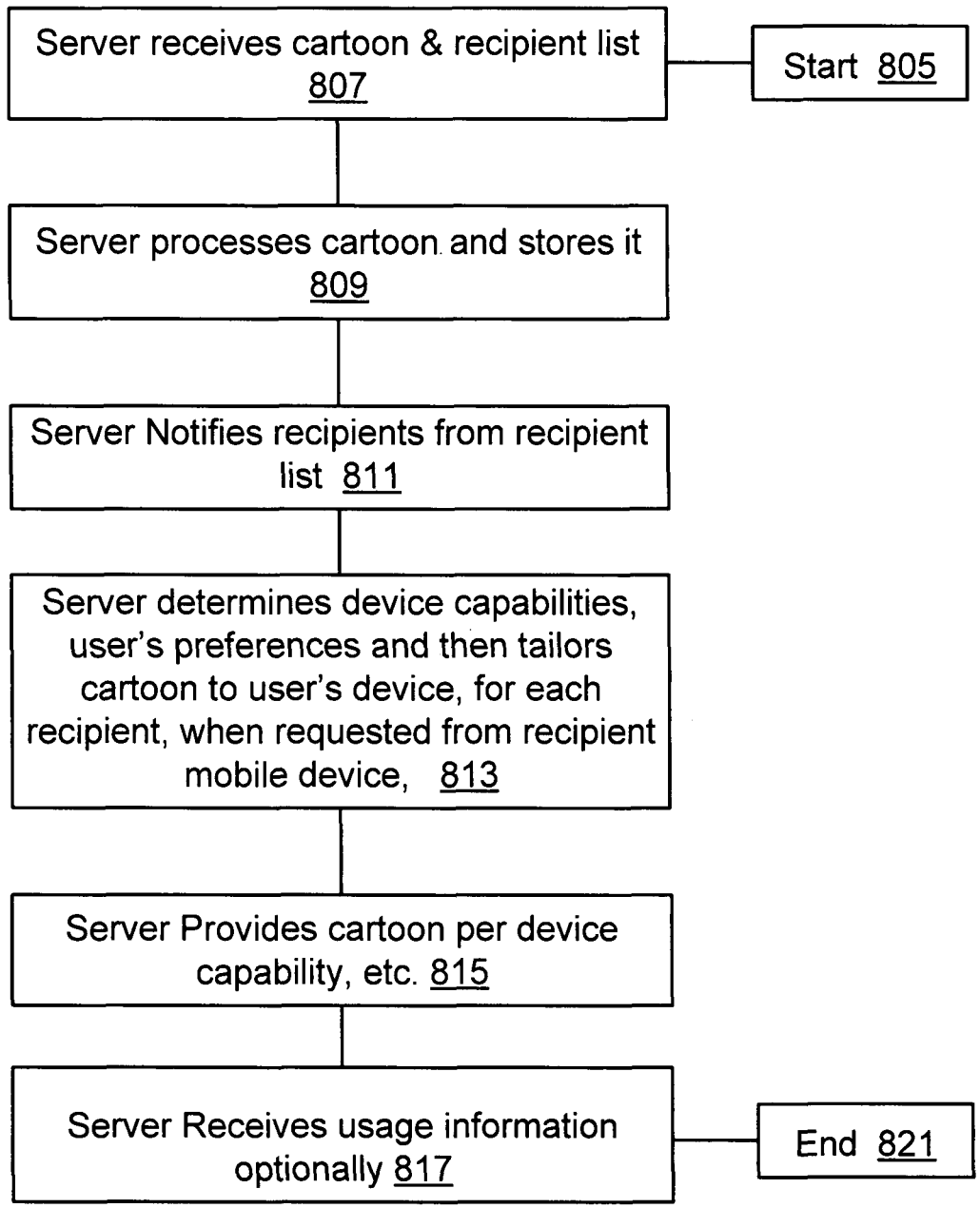
FIG. 8 is a flow chart of another exemplary operation of the cartoon distribution server capable of distributing cartoons.

FIG. 8 is a flow chart of another exemplary operation of the cartoon distribution server capable of distributing cartoons. Processing starts at a start block 805. Then, at a next block 807, the cartoon distribution server receives cartoons and a recipient list from a provider of cartoons. Then, at a next block 809, the cartoon distribution server processes the received cartoons and recipient list and stores it. Then at a next block 811, the cartoon distribution server notifies recipients from the list about the availability of the cartoons. It can also communicate a reference to the cartoons to the mobile device as part of the notification. Then, at a next block 813, cartoon distribution server determines the device capabilities of the recipient devices, user's preferences, etc. Then the cartoon distribution server tailors cartoons to user's mobile device (or selects an appropriate version of the cartoons, if more than one version or more than one packaging is available), for each recipient, when requested from recipient mobile device. Then, at a next block 815, the cartoon distribution server provides the cartoon to each of the recipient devices based on device capabilities. Then, at a next block 817, the cartoon distribution server optionally receives usage information from the mobile devices and sends them (after optional collation) to a provider's server (or a billing server). Finally, processing terminates at the next end block 821.

Figure 9:
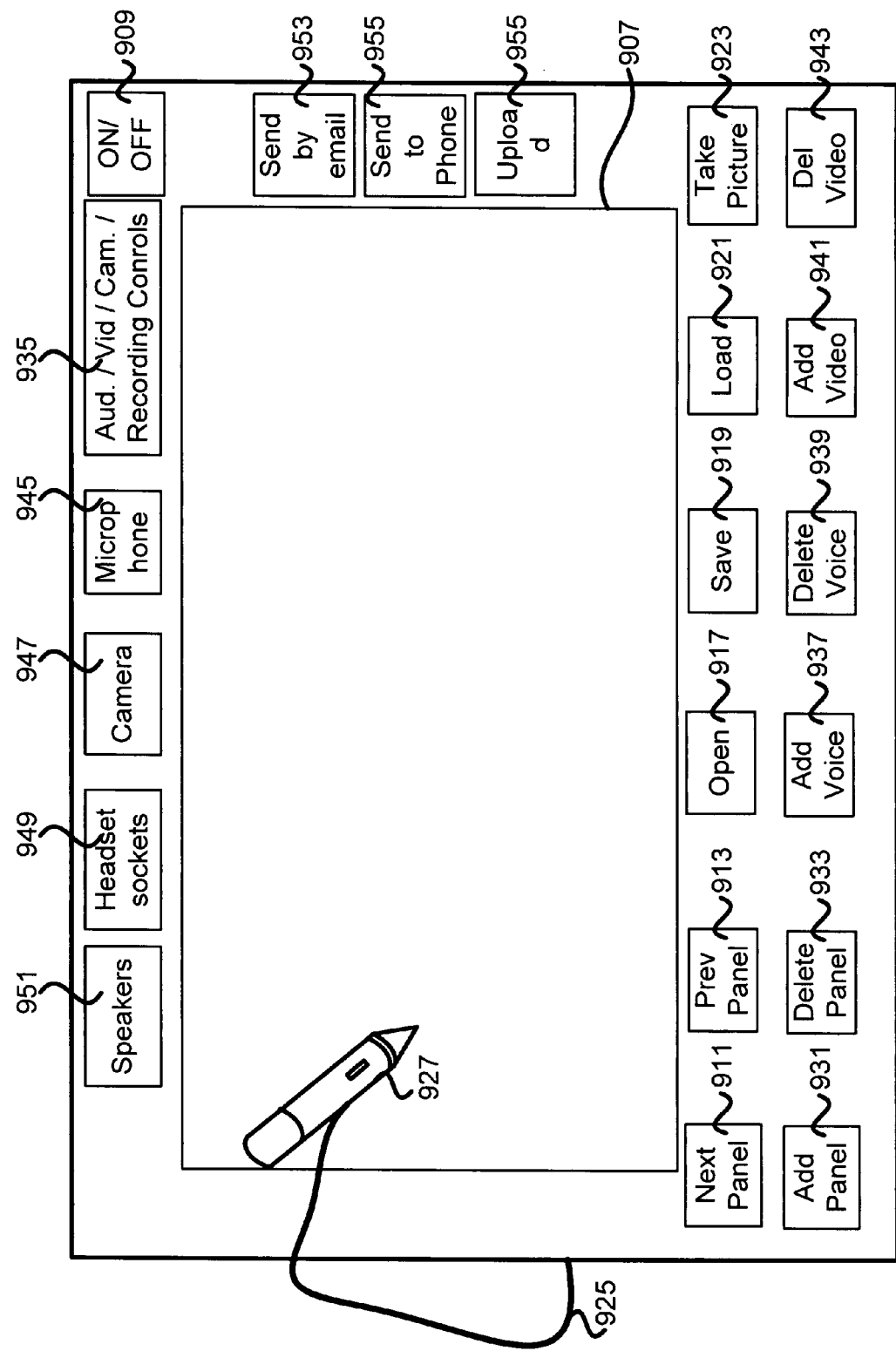
FIG. 9 is a perspective block diagram of a cartoon creator device built in accordance with the present invention that facilitates creation of cartoons, sending cartoons to recipients via email or using the recipient's mobile phone numbers, and managing the cartoons created.

FIG. 9 is a perspective block diagram of a cartoon creator device 905 built in accordance with the present invention that facilitates creation of cartoons, sending cartoons to recipients via email or using the recipient's mobile phone numbers, and managing the cartoons created. The cartoon creator device 905 comprises a screen 907 on which graphics can be drawn by a user using a wired or wireless interactive pen 927, such as a digital pen, and on which optionally a digital keyboard can be displayed to enable user selection of letters and numbers to form a text. The screen 907 is touch sensitive, and capable of accepting user inputs through the pen 927 or via physical finger touches of a user on the screen 907. The screen 907 along with the interactive pen 927 combines the advantages of an LCD monitor with the ease of use of tablet technology. It makes it possible for a user to work directly on the screen, with the user being able to navigate much more quickly and naturally and draw on the screen 907. The screen 907 is also used to view digital photos taken by a user employing the camera 947 on (inbuilt, provided with, or attached to) the cartoon creator device 905. It is also used to view retrieved clipart, diagrams, and other data stored in an associated storage, or those accessed from remote storages or websites.

The cartoon creator device 905 comprises a set of buttons that facilitate creation of cartoon panels, deletion of cartoon panels, incorporation of text, voice, graphics, digital photos, video clips, etc. into a cartoon panel. It also comprises a set of buttons that facilitate/trigger sending a created or stored cartoon via email to one or more recipients using their email addresses, or sending them to one or more recipients using their mobile phone numbers onto the recipient's mobile devices. Although the screen can display a keyboard for selection of letters to make text, an external keyboard can optionally be plugged into the cartoon creator device 905.

The exemplary buttons provided on the cartoon creator device 905 comprise an Add Panel button 931 used to add new panels while creating a cartoon, a Next Panel button used to advance to next panel if any, a Prev Panel button 913 for reviewing a previous panel in a list of cartoon panels, a Delete Panel button 933 to delete cartoon panels, a Open 917 button to open previously closed files, such as graphic files, audio files, etc., an Add Voice button 937 to capture user voice inputs using the inbuilt microphone 945 or plugged external microphones. It also comprises a Delete Voice button to delete recorded voice/audio files/portions of a cartoon, a Save button 919 to save current cartoons, a Load button 921 to load previously saved cartoons or files, an Add Video button 941 to add a video as a video portion of a cartoon panel, a Del Video 943 button to delete video portions of a cartoon panel, and a Take Picture button 923 to take a photograph employing the camera 947 on the cartoon creator device 905. In addition, a Send by email button 953 makes it possible for a user to provide email addresses of recipients of the cartoons, and a Send to Phone button 955 makes it possible for a user to provide mobile phone numbers of the recipient mobile devices used by the intended recipients of the cartoon. An upload button 955 makes it possible for a user to upload created cartoons to a cartoon distribution server (or other servers).

The cartoon creator device 905 also comprises speakers 951, a headset sockets 949, a the camera 947 used to capture video and take photographs, the microphone 945 used to capture music and voice, and an audio/video/camera recording controls 935 that is used to control capturing inputs from the associated microphone 945, camera 947, etc. The cartoon creator device 905 also comprises an ON/OFF button 909.

In one embodiment, the keys on the cartoon creator device 905 are programmable and can be setup to be ExpressKeys. In another embodiment, the keys are finger-sensitive touch strip, located on the top and bottom sides of the screen surface 907, and are within easy reach of a user. They can be used for modifier keys, keyboard shortcuts, scrolling, zooming, controlling brush size and more. In a related embodiment, the interactive pen is a cordless, battery-free Grip Pen that offers 1,024 levels of pressure sensitivity for controlled, flexible creative drawing. In another embodiment, the cartoon creator device 905 is a touchpad that provides cartoon creation screens and buttons, that can be used in conjunction with a wired or wireless pen to create a multi-panel cartoon, each panel capable of displaying text, graphics, videos, or a combination of those, along with accompanying an ordered set of audio (typically voice or music) information.

Figure 10:
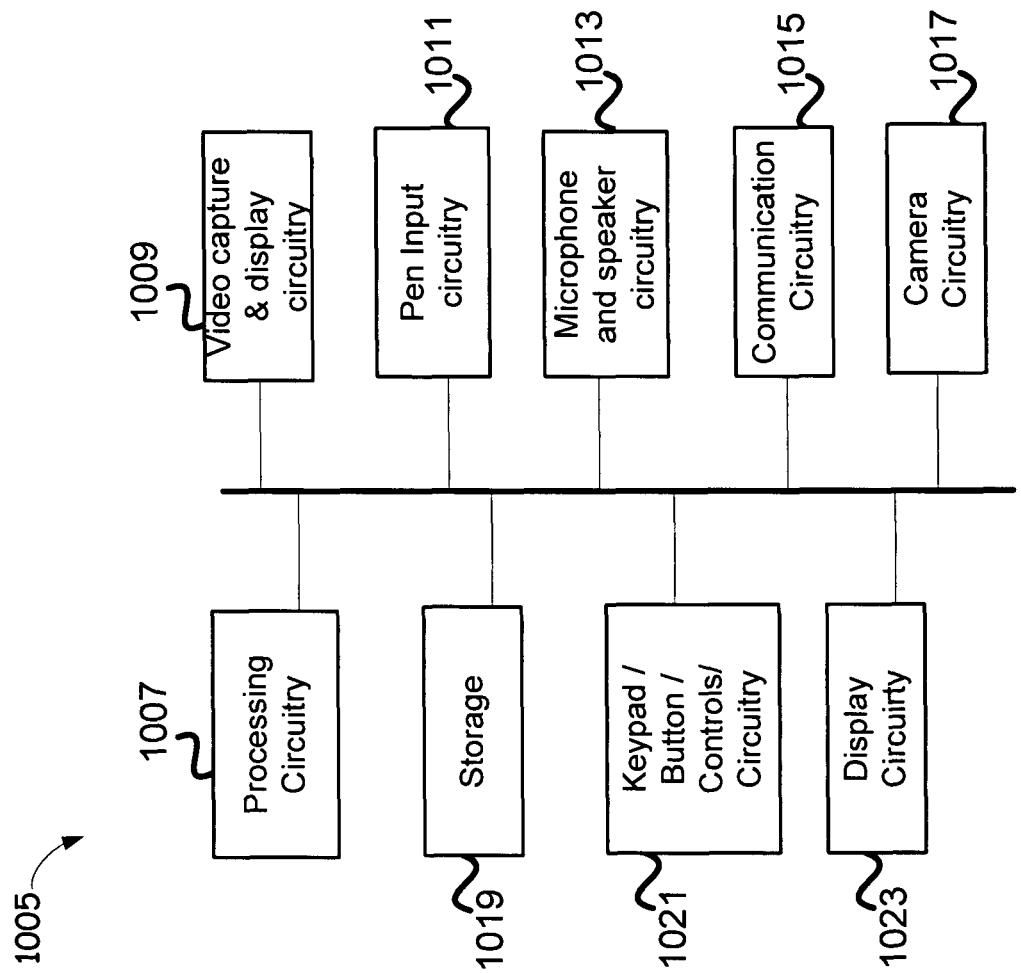
FIG. 10 is an exemplary schematic block diagram of a cartoon creator device that supports creation of cartoons and sending cartoons to one or more recipients.

FIG. 10 is an exemplary schematic block diagram of a cartoon creator device 1005 that supports creation of cartoons and sending cartoons to one or more recipients. The cartoon creator device 1005 comprises a processing circuitry 1007 communicatively coupled to a storage 1010, a keypad/button/controls circuitry 1021, a video capture & display circuitry 1009, a pen input circuitry 1011, a microphone and speaker circuitry 1013, a communication circuitry 1015, a camera circuitry 1017 and a display circuitry 1023.

FIG. 11 is an exemplary flow chart of the operation of the cartoon creator device 905, 1005 wherein the cartoon creator device is used by a user to create and send a multi-panel cartoon. The processing stats when the user turns the cartoon creator device 905 on using the ON/OFF button. Then, at a next block 1107, the Cartoon 905 Creator device facilitates new cartoon creation as the user thinks of cartoon to make and either loads an existing cartoon (which can be a work in progress) or decides to make a new one and provides a name for it. Then, at a next block 1109, the cartoon creator device facilitates panel creation & voice inputs for each character per panel as user plans on number of panels and the number of characters per panel. Typically, if a panel has a small number of characters, each of them are likely to have an associated audio input for each panel, with additional audio inputs for background music, or some contextual audio.

Then, at a next block 1111, the cartoon creator device helps the user sketch each of the cartoon panels with characters, incorporate clipart & graphics drawn on paper, etc. The user can go back to previous panels using the Prev button, and advance to the subsequent ones using the Next button.

Then, at a next block 1113, the cartoon creator device helps the user record voice for each character for each panel using the microphone provided. The user can add voice or multiple individuals can add voice for the different characters on any given panel. The user can reorder the voice inputs, if necessary, after they have been captured using the microphone. The user can reuse the captured audio in more than one panel, if necessary.

Then, at a next block 1115, the cartoon creator device helps the user edit the cartoon and change the diagrams if needed, such as by providing different backgrounds to the diagrams or by changing the coloring of the graphic diagrams as necessary. The cartoon creator device also facilitates incorporation of any pictures drawn on paper, or photos taken by a user using the camera provided or from a different camera that n=may be communicatively coupled to the cartoon creator device.

Then, at a next block 1117, the cartoon creator device facilitates saving of the cartoon, if necessary, sending the cartoon by email, sending the cartoon using a mobile phone number of one or more recipients, uploading the cartoon to a cartoon distribution server optionally, etc. Finally, at a next end block 1121, the processing terminates.

Although the flowchart of FIG. 11 is described in terms of functionality of a cartoon creator device, it should be obvious that similar functionality can be provided (or at least a subset of these) in a cartoon creator component that can be installed in a PC/notebook/laptop, or provided as a hosted service by a cartoon distribution server.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A system for creating and distributing a cartoon, the system comprising:
   at least one processor for processing cartoons received from at least one cartoon creator device, the processing comprising:
   identifying in which of a plurality of queues for each of a plurality of recipients, if any, to store a received cartoon, according to metadata information of each cartoon and profile information for each of the plurality of recipients,
   storing the received cartoon in each of the identified queues, and
   distributing cartoons from the plurality of queues for the plurality of recipients to cartoon display devices of the plurality of recipients;
   wherein the at least one cartoon creator device comprises cartoon creator software that is executed on the cartoon creator device, that facilitates creation of a cartoon, wherein the cartoon comprises a plurality of panels, wherein each panel comprises a graphics, a text, and an ordered set of audio clips recorded by the cartoon creator software, and wherein the cartoon creator software steps a user through creation of each of the plurality of panels, one panel at a time, including recording of one of the ordered set of audio clips for each cartoon character of each panel;
   wherein each cartoon display device comprises a cartoon client component that enables a recipient to view one or more cartoons from a recipient selected one of the plurality of queues for the recipient.

2. The system for creating and distributing a cartoon according to claim 1, wherein the cartoon client component presents the ordered set of audio clips for each of the plurality of panels in an order specified.

3. The system for creating and distributing a cartoon according to claim 1, wherein the cartoon creator device is one of a PC, a notebook computer or a laptop.

4. The system for creating and distributing a cartoon according to claim 1, wherein the cartoon display device is a mobile device.

5. The system for creating and distributing a cartoon according to claim 1, further comprising:
   wherein the at least one processor comprises a server communicatively coupled to the cartoon creator device and the cartoon display device; and
   the server facilitating the dissemination of the cartoon received from the cartoon creator device to the cartoon display device.

6. The system for creating and distributing a cartoon according to claim 5, further comprising:
   a plurality of mobile devices communicatively coupled to the server, each with at least one of an IP address, an email address or a phone number;
   the server receiving a list of recipients along with the cartoon from the cartoon creator device, wherein the list of recipients comprises one of an IP address, an email address or a phone number for at least one of the plurality of mobile devices; and
   the server communicating the cartoon to the at least one of the plurality of mobile devices employing the list of recipients.

7. The system for creating and distributing a cartoon according to claim 1, wherein
   the cartoon creator software provides screens for creation and modification of the plurality of panels, one panel at a time;
   enables capturing a plurality of audio inputs, for each panel; and
   facilitates arrangement of the plurality of audio inputs, for each panel, into an ordered set of audio clips.

8. The system for creating and distributing a cartoon according to claim 7, wherein the cartoon creator device further comprises:
   a microphone;
   a music piece in digital form; and
   wherein each of the audio inputs are either one of a voice input captured by the cartoon creator software employing the microphone or at least a portion of a music piece incorporated by the cartoon creator software.

9. The system for creating and distributing a cartoon according to claim 1, wherein the cartoon creator software provides means to integrate a pre-created graphics and a digital image into at least one of the plurality of panels of the cartoon.

10. A mobile device that is communicatively coupled to a network, the mobile device comprising:
    at least one non-volatile memory having stored therein one or both of firmware and software;
    at least one processor operably coupled to the non-volatile memory, wherein the at least one processor, during operation, at least:
    displays to a user of the mobile device, a list of cartoons that are stored in at least one of a plurality of queues for the user, the listed cartoons having been identified for storage in the at least one of the plurality of queues according to metadata information of each cartoon and profile information for the user of the mobile device, wherein the metadata information comprises a category identifier;
    accepts from the user, a selection of a listed cartoon for viewing;
    receives at least one portion of the selected cartoon wherein the cartoon comprises a plurality of panels, wherein each panel comprises a graphics, a text, and an ordered set of audio clips;
    displays the panels of the at least one portion of a cartoon sequentially one panel at a time;
    accepts user input associated with the at least one portion of a cartoon; and
    selectively advances to a subsequent panel or reverts to a previous panel of the at least one portion of a cartoon, in response to the user input.

11. The mobile device of claim 10, further comprising:
    the at least one processor operably coupled to the non-volatile memory, wherein the at least one processor, during operation, further at least:
    receives a notification with one of a link, an identification or a reference to the cartoon; and
    retrieves the cartoon from a server communicatively coupled to the mobile device to present it to the user.

12. The mobile device of claim 10, further comprising:
the at least one processor operably coupled to the non-volatile memory, wherein the at least one processor, during operation, further at least:
for each panel of the plurality of panels of the cartoon, plays the ordered set of audio clips in a specified order, sequentially, one audio clip at a time.

13. The mobile device of claim 12, wherein the ordered set of audio clips are played in the specified order, sequentially, triggered by the user input, one audio clip at a time.

14. The mobile device of claim 10, further comprising:
a cartoon client component;
the cartoon client component presenting a list of available cartoons to the user and prompting the user to select from the list of available cartoons;
the cartoon client component receiving a cartoon based on a user selection from the list of available cartoons; and
the cartoon client component displaying the cartoon to the user.

15. A device to create a cartoon, the device comprising:
a microphone to record voice input;
a cartoon creator software that facilitates panel creation for the cartoon wherein the cartoon comprises a plurality of panels;
at least one of the plurality of panels comprising at least one cartoon character;
the cartoon creator software stepping a user through creation of each of the plurality of panels, one panel at a time, including recording the voice input for one of an ordered set of audio clips for each of the at least one cartoon character, employing the microphone;
the cartoon creator software associating the voice input with the corresponding at least one cartoon character and the corresponding at least one of the plurality of panels and storing the voice input, and metadata comprising a category identifier, as part of the cartoon; and
transmitting the cartoon for queuing and distribution to recipients identified using the metadata of the cartoon and profile information for each recipient.

16. The device of claim 15, the device further comprising:
the cartoon creator software facilitating the creation of a cartoon comprising a plurality of characters; and
each of the plurality of panels comprising a representation of at least one of the plurality of characters, wherein the representation is at least one of a graphic image, a text dialog, a portion of the voice inputs and an audio input.

17. The device of claim 16, wherein the audio input is one of a recorded voice input, a digital recording of an instrument being played and a portion of a music item available in the device.

18. The device of claim 16, wherein the cartoon creator software facilitates graphic sketching of at least one of the plurality of characters by a user for at least one of the plurality of panels.

19. The device of claim 15, wherein the cartoon creator software facilitates incorporation of at least one of a clipart, a pre-recorded music, a background art, a digital photograph taken by the device and a video clip into at least one of the plurality of panels.

20. The device of claim 15, further comprising:
the cartoon creator software facilitating saving of the cartoon in the device;
the cartoon creator software facilitating sending of the cartoon by email to one or more recipients; and
the cartoon creator software facilitating uploading of the cartoon to a distribution server, communicatively coupled to the device, along with a list of the one or more recipients.

* * * * *